United States Patent [19]

Kinoshita et al.

[11] Patent Number: 5,422,062
[45] Date of Patent: Jun. 6, 1995

[54] METHOD OF MANUFACTURING DEODORIZING FILTER

[75] Inventors: Tatsuyuki Kinoshita; Naokazu Takeuchi; Hiroshi Isozaki, all of Nagoya, Japan

[73] Assignee: Mitsubishi Jukogyo Kabushiki Kaisha, Tokyo, Japan

[21] Appl. No.: 732,149

[22] Filed: Jul. 18, 1991

Related U.S. Application Data

[62] Division of Ser. No. 554,128, Jul. 17, 1990, Pat. No. 5,372,788.

[51] Int. Cl.⁶ ............................................. B29C 53/24
[52] U.S. Cl. .................................... 264/131; 156/184; 156/290; 264/136
[58] Field of Search ................. 156/89, 184, 183; 55/523, 524, 527; 427/179, 201, 180, 244, 372.2, 443.2; 264/131, 136

[56] References Cited

U.S. PATENT DOCUMENTS 3,112,184 11/1963 Hollenbach .................... 264/317
3,857,732 12/1974 Yoshino ......................... 427/389.9

Primary Examiner—Christopher A. Fiorilla
Attorney, Agent, or Firm—McAulay Fisher Nissen Goldberg & Kiel

[57] ABSTRACT

A method for manufacturing a honeycomb deodorizing filter including ceramic fibrous paper supporting cuprous oxide or both cuprous oxide and solid acid includes the steps of: soaking ceramic fibrous paper in a slurry; drying the soaked paper; and forming the dried paper into a honeycomb filter. The slurry includes a mixture of a reductant-added water solution with either (i) the cuprous oxide and binder, or (ii) cuprous oxide, solid acid and binder. Alternately, the fibrous paper and binder may first be formed into a honeycomb filter and then soaked in the slurry.

16 Claims, 1 Drawing Sheet

METHOD OF MANUFACTURING DEODORIZING FILTER

This is a division of application Ser. No. 07/554,128, filed Jul. 17, 1990, now U.S. Pat. No. 5,372,788.

FIELD OF THE INVENTION AND RELATED ART STATEMENT

The present invention relates to a deodorizing filter and a method for manufacturing it, more particularly, to a honeycomb-type deodorizing filter for reduction of odor applicable to an air conditioner, air cleaner, etc.

The conventional honeycomb-type deodorizing filter providing high deodorizing efficiency with less pressure loss includes the filter formed by extruding activated carbon, the filter constructed of paperlike fibrous activated carbon, etc., which have been applied to the air conditioner and the like. However, it is true that, in the conventional deodorizing filters described above, physical adsorbing capability of the activated carbon has been fully utilized, but it is imposible for the activated carbon to effectively adsorb the odor from hydrogen sulfide and ammonia, and, furthermore, there has been such a problem that the odor once adsorbed by the activated carbon is easily desorbed by surrounding conditions such as temperature, humidity, etc.

OBJECT AND SUMMARY OF THE INVENTION

It is an object of the present invention to provide a deodorizing filter being able to overcome the problems in the conventional technologies and a method for manufacturing it.

In the present invention, to achieve the above object, the deodorizing filter is composed of honeycomb structure of ceramic fibrous paper supporting cuprous oxide or both the cuprous oxide and solid acid.

In the manufacturing method provided by the present invention, the ceramic fibrous paper is soaked in the slurry of the mixture of reductant-added water soulution with the cuprous oxide and binder or with the cuprous oxide, solid acid and binder is dried; and then the ceramic fibrous paper is formed into the honeycomb-type filter; or the ceramic fibrous paper is formed first into the honey-comb-type filter and then is soaked in the slurry of the mixture of reductant-added water solution with the cuprous oxide and binder or with the cuprous oxide, solid acid and binder and finally is dried to make the deodorizing filter.

The cuprous oxide is highly effective against the odor from hydrogen sulfide, mercaptan, ammonia and amine known as the big four malodor sources. Moreover, the solid acid has its acid center on the surface chemically bonding basic gas such as ammonia, amine, etc., to provide strong adsorption and rapid deodorization.

In the present invention, by adopting the cuprous oxide or both the cuprous oxide and solid acid, a high deodorizing efficiency is achieved; by being accompanied by chemical reaction such as oxidation and decomposition or chemical adsorption, the desorption of the odor is inhibited under the normal conditions of temperature and humidity; and by making the filter honeycomb-shaped, pressure losses are minimized.

Such solid acid to be used in the present invention includes silicic acid, alumina, aluminosilicate, titanium oxide and many others.

Moreover, such ceramic fiber includes rock wool, flower fiber, glass fiber, silica fiber, alumina silica fiber, alumina fiber, mullire fiber, zirconia fiber, etc.

Furthermore, as reductants to be used for manufacturing in the present invention, erythorbic acid, erythorbic acid sodium, ascorbic acid, ascorbic acid sodium, oxalic acid, etc., are usable.

The binder includes organic compounds such as methyl cellulose, acrylic emulsion, etc., and inorganic compounds such as colloidal silica, alumina sol, etc., as well.

In addition to the above, in order to increase contacting area of the cuprous oxide with the odor, the fiber is designed to allow the ceramic fibrous paper to support porous compounds together with the cuprous oxide wherein activated carbon zeolite, for example, can be usable as the porous compound.

The detailed description of the embodiment of the present invention is set forth below.

The cuprous oxide only or the cuprous oxide and zeolite are mixed with water solution of L-ascorbic acid, a preventer against oxidation and degradation of the cuprous oxide and diffused; and the paper composed of rock wool is soaked in the slurry to which acrylic emulsion is added to stabilize the cuprous oxide or the zeolite.

This paper is subjected to a corrugating process and laminated to make the honeycomb-formed filter.

Thus, the honeycomb-type deodorizing filter with fine cells supporting the cuprous oxide with a high deodorizing efficiency within the skeleton wall of the ceramic fiber can be manufactured.

This filter can deodorize the malodor from hydrogen sulfide, ammonia, etc. and be applied to the air conditioner, etc., owing to less pressure loss.

By mixing the cuprous oxide with the porous zeolite and supporting the mixture within the skeleton of the ceramic fiber, the contacting area of the cuprous oxide with the odor is increased enabling the deodorizing efficiency to be raised and, furthermore, the adsorption of the basic odor on the acid center of the zeolite enables the filter to deodorize effectively as well.

In addition, as another embodiment, the paperlike fiber made of rock wool as ceramic fiber, is soaked in the slurry wherein the cuprous oxide and solid acid having high acidity such as aluminosilicate powder and mixed and diffused in water solution containing L-ascorbic acid as a preventer against oxidation and degradation and the binder such as methyl cellulose is added to stabilize the cuprous oxide and solid acid. After that, this paper is dried, subjected to a corrugating process, laminated and burned to make the honeycomb-type deodorizing filter.

Contrary to the abovementioned method, the same deodorizing filter as described above, can be manufactured by the method wherein the paperlike fiber made of rock wool being one of ceramic fibers is given corrugating process, laminated and burned to make the honeycomb-shaped structure; and this fiber structure is soaked in the slurry made by mixing the cuprous oxide and aluminosilicate as solid acid as well as methyl cellulose as a binder with water solution containing L-ascorbic acid and is dried.

By supporting the cuprous oxide and solid acid thus obtained within the skeleton wall of the ceramic fiber, the honeycomb-type filter with fine cells can deodorize the basic odor from ammonia, amine, etc., more effectively than the embodiment aforementioned.

BRIEF DESCRIPTION OF THE DRAWINGS

FIG. 1 shows the odor reduction rate of hydrogen sulfide and FIG. 2 shows the odor reduction rate of trimethylamine.

DETAILED DESCRIPTION OF PREFERRED EMBODIMENTS (1) 100 volume units in each instance zeolite from which sodium had been removed by acid treatment and 100 volume units—in each instance; cuprous oxide was mixed with 800 volume units in each instance of 1% ascorbic acid water solution and thereto colloidal silica was added to make the mixture containing 3% silica and diffused to produce slurry. Extreme thin paper made of ceramic fibers was soaked in the slurry and was made honeycomb-shaped by a corrugator roll, given binder treatment and burned to produce the honeycomb-type filter with the number of honeycomb cells of 543/10 cm2.

10 ppm hydrogen sulfide was let to flow through the filter cut into piece 5 cm in thickness at a speed of 1 m/sec and the gas from the outlet side of the filter was introduced into a gas chromatography to test using a flamed photographic detector and, at the same time, a pressure loss incurred in the filter was measured. As a result, the pressure loss was low 0.59 mmaq and the concentration of hydrogen sulfide at the outlet was within the limit value allowed to be detected even after one hour.

(2) The ceramic paper made by adding colloidal silica, as a binder, to the silica alumina fiber was formed into stepped ceramic paper by a corrugator roll, laminated and burned at a temperature of 500 degrees C. to produce a ceramic honeycomb structure that was then cut into pieces 5 cm in thickness to manufacture the filter material. 3 ml of 20% colloidal silica was added to the mixture of 100 volume amorphous alumina silica compound($AL_2O_3.9SiO_2.xH_2O$) and 100 volume units cuprous oxide with 800 volume units 1% ascorbic acid water solution and was diffused to make slurry in which the abovementioned filter material was soaked and dried at a temperature of 150 degrees C. for one hour to produce a deodorizing filter.

10 ppm hydrogen sulfide and trimethylamine were let to flow through the filter at a speed of 1 m/sec and the gas from the outlet side was introduced to a gas chromatography to measure the concentration and, at the same time, a pressure loss in the honeycomb filter was measured.

The activated carbon urethane ordinarily used as a control were also provided for the test.

Figure 1:
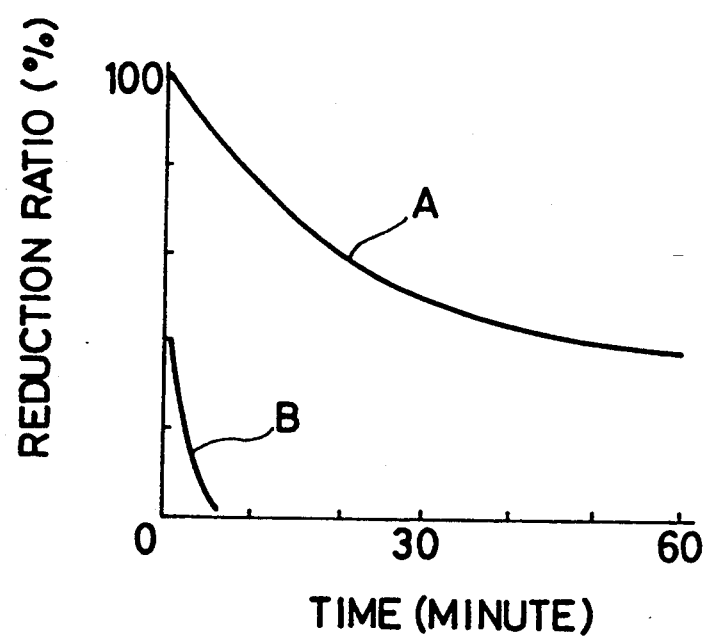
FIG. 1 and 2 are diagrams showing the efficiency of the deodorizing filter of this invention.
Figure 2:
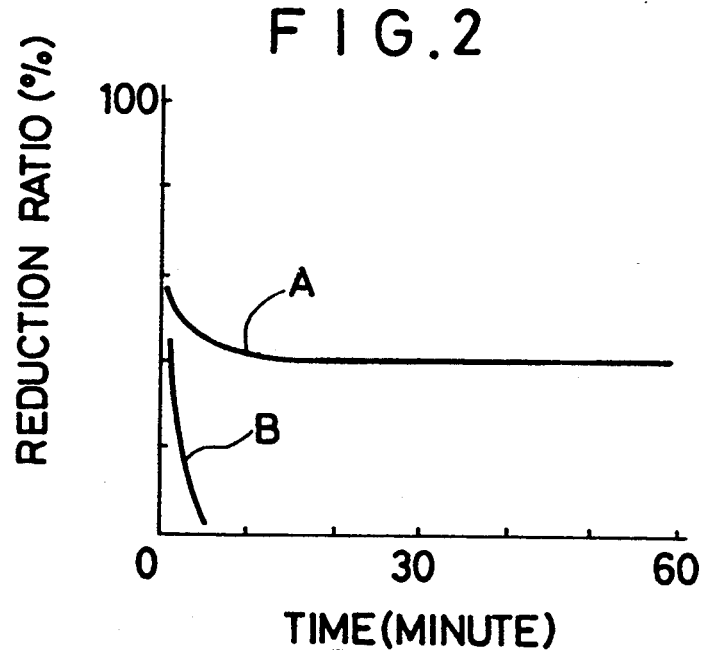

As a result, the pressure loss incurred in the filter provided by the present invention was 0.6 mmaq showing a smaller loss than that of the activated carbon urethane (1.1 mmaq)and, nevertheless, the deodorizing effect against the odor both from hydrogen sulfide and trimethylamine was maintained for a long period as shown in FIG. 1 and 2.

FIG. 1 is a diagram showing the odor reduction rate of hydrogen sulfide and FIG. 2 showing the odor reduction rate of trimethylamine. In the diagram, A represents the deodorizing filter provided by the present invention and B represents the deodorizing filter made of activated carbon urethane.

We claim:

1. A method for manufacturing a deodorizing filter, comprising the steps of
   preparing a slurry comprising a reducing agent, cuprous oxide, a binder, and water;
   impregnating a paper of a ceramic fiber with said slurry; drying said paper; and
   forming said paper into a honeycomb structure.

2. The method of claim 1 wherein a porous powder is added to said slurry.

3. The method of claim 2 wherein the reducing agent is selected from the group consisting of erythorbic acid, erythorbic acid sodium, ascorbic acid, ascorbic acid sodium, and oxalic acid.

4. The method of claim 1 wherein the reducing agent is selected from the group consisting of erythorbic acid, erythorbic acid sodium, ascorbic acid, ascorbic acid sodium, and oxalic acid.

5. A method for manufacturing a deodorizing filter, comprising the steps of
   preparing a slurry comprising a reducing agent, cuprous oxide, a binder, a solid acid, and water;
   impregnating a paper of a ceramic fiber with said slurry; drying said paper; and
   forming said paper into a honeycomb structure.

6. The method of claim 5 wherein the reducing agent is selected from the group consisting of erythorbic acid, erythorbic acid sodium, ascorbic acid, ascorbic acid sodium, and oxalic acid.

7. A method for manufacturing a deodorizing filter, comprising the steps of
   forming a paper made of ceramic fiber and a binder into a honeycomb structure;
   preparing a slurry comprising a reducing agent, cuprous oxide, a binder and water;
   soaking the paper in the slurry; and
   drying said paper.

8. The method of claim 7 wherein a porous powder is added to said slurry.

9. The method of claim 8 wherein the reducing agent is selected from the group consisting of erythorbic acid, erythorbic acid sodium, ascorbic acid, ascorbic acid sodium, and oxalic acid.

10. The method of claim 7 wherein the reducing agent is selected from the group consisting of erythorbic acid, erythorbic acid sodium, ascorbic acid, ascorbic acid sodium, and oxalic acid.

11. A method for manufacturing a deodorizing filter, comprising the steps of forming a paper made of ceramic fiber and a binder into a honeycomb structure;
    preparing a slurry comprising a reducing agent, cuprous oxide, a binder, a solid acid and water;
    soaking the paper in the slurry; and
    drying said paper.

12. The method of claim 11 wherein the reducing agent is selected from the group consisting of erythorbic acid, erythorbic acid sodium, ascorbic acid, ascorbic acid sodium, and oxalic acid.

13. A method for manufacturing a deodorizing filter wherein ceramic fibrous paper is soaked in a slurry of a mixture of an aqueous solution of a reducing agent with cuprous oxide, solid acid and binder, and then dried; and then the dried ceramic fibrous paper is formed into a honeycomb filter.

14. The method of claim 13 wherein the reducing agent is selected from the group consisting of erythorbic acid, erythorbic acid sodium, ascorbic acid, ascorbic acid sodium, and oxalic acid.

15. A method for manufacturing a deodorizing filter wherein ceramic fibrous paper with a binder added is formed into a honeycomb filter which is then soaked in a slurry of a mixture of an aqueous solution of a reducing agent with cuprous oxide, solid acid and a binder, and the soaked filter is dried to make the deodorizing filter.

16. The method of claim 15 wherein the reducing agent is selected from the group consisting of erythorbic acid, erythorbic acid sodium, ascorbic acid, ascorbic acid sodium, and oxalic acid.

* * * * *